United States Patent
Archambault

(10) Patent No.: US 7,100,156 B2
(45) Date of Patent: Aug. 29, 2006

(54) INTERPROCEDURAL DEAD STORE ELIMINATION

(75) Inventor: Roch Georges Archambault, North York (CA)

(73) Assignee: International Business Machines Corporation, Armonk, NY (US)

( * ) Notice: Subject to any disclaimer, the term of this patent is extended or adjusted under 35 U.S.C. 154(b) by 498 days.

(21) Appl. No.: 09/965,521

(22) Filed: Sep. 27, 2001

(65) Prior Publication Data

US 2002/0095669 A1 Jul. 18, 2002

(30) Foreign Application Priority Data

Sep. 27, 2000 (CA) ................................. 2321016

(51) Int. Cl.
*G06F 9/45* (2006.01)
*G06F 9/44* (2006.01)

(52) U.S. Cl. ...................... 717/159; 717/156; 717/157; 712/241

(58) Field of Classification Search ................ 717/116, 717/133–161, 4; 707/206; 712/228, 241; 711/159, 132
See application file for complete search history.

(56) References Cited

U.S. PATENT DOCUMENTS

| | | | | |
|---|---|---|---|---|
| 4,951,194 A | * | 8/1990 | Bradley et al. ............. 711/132 |
| 5,175,856 A | * | 12/1992 | Van Dyke et al. ........... 717/151 |
| 5,179,702 A | * | 1/1993 | Spix et al. .................... 718/102 |
| 5,428,793 A | * | 6/1995 | Odnert et al. ................ 717/157 |
| 5,485,616 A | * | 1/1996 | Burke et al. ................. 717/133 |
| 5,555,417 A | * | 9/1996 | Odnert et al. ................ 717/159 |
| 5,590,332 A | * | 12/1996 | Baker .......................... 717/151 |
| 5,812,855 A | * | 9/1998 | Hiranandani et al. ....... 717/157 |
| 5,850,549 A | * | 12/1998 | Blainey et al. ............. 717/156 |
| 5,878,261 A | * | 3/1999 | Holler et al. ................ 717/157 |
| 6,041,179 A | * | 3/2000 | Bacon et al. ................ 717/116 |
| 6,173,444 B1 | * | 1/2001 | Archambault ............... 717/159 |
| 6,182,284 B1 | * | 1/2001 | Sreedhar et al. ............ 717/146 |
| 6,381,738 B1 | * | 4/2002 | Choi et al. ................... 717/140 |
| 6,487,716 B1 | * | 11/2002 | Choi et al. ................... 717/159 |
| 2002/0010911 A1 | * | 1/2002 | Cheng et al. .................. 717/4 |
| 2002/0166115 A1 | * | 11/2002 | Sastry ......................... 717/151 |

(Continued)

OTHER PUBLICATIONS

Kandemir et al., A framework for interprocedural locality optimization using both loop and data layout transformations, Sep. 1999, IEEE, pp. 95-102.*

(Continued)

*Primary Examiner*—Wei Zhen
*Assistant Examiner*—Satish S. Rampuria
(74) *Attorney, Agent, or Firm*—Douglas W. Cameron, Esq.; McGinn IP Law Group, PLLC

(57) ABSTRACT

A system for optimizing computer code generation by carrying out interprocedural dead store elimination. The system carries out a top down traversal of a call graph in an intermediate representation of the code being compiled. Live on exit (LOE) sets are defined for variables at call points for functions in the code being compiled. Bit vectors representing the LOE sets for call points for functions are stored in an LOE table indexed or hashed by call graph edges. For each function definition reached in the call graph traversal, a LOE set for the function itself is generated by taking the union of the LOE call point sets. The entries in the LOE table for the LOE call point sets are then removed. The LOE set for each function is used to determine if variables that are the subject of a store operation in a function may be subject to a dead store elimination optimization.

18 Claims, 1 Drawing Sheet

U.S. PATENT DOCUMENTS

2003/0005421 A1* 1/2003 Prakash et al. ............. 717/152
2004/0205740 A1* 10/2004 Lavery et al. ............. 717/151

OTHER PUBLICATIONS

Genin et al., System design, optimization and intelligent code generation for standard digital signal processors, May 1989, IEEE, vol. 1, pp. 565-569.*

Carr et al., Compiler optimization for improving data locality, 1994, IEEE, pp. 252-262.*

Cooper, Interprocedural Analyses of Fortran Programs, Citeseer, 1997, pp. 1-33.*

Cooper, Fast Interprocedural Alias Analysis, ACMPRESS, Jan. 1989, pp. 49-59.*

Mahlke, Design and Implementation of a Portable Global Code Optimizer, http://www.crhc.uiuc.edu/IMPACT/ftp/report/ms-thesis-scott-mahlke.pdf, 1998, pp. 1-78.*

Hall et al., Interprocedural compilation of Fortran D for MIMD distributed-memory machines, IEEE, Nov. 1992, pp. 522-534.*

Knoop et al., Interprocedural distribution assignment placement: more than just enhancing intraprocedural placing techniques, IEEE, Nov. 1997, pp. 26-37.*

Inagaki et al., Supporting software distributed shared memory with an optimizing compiler, IEEE, Aug. 1998, pp. 225-234.*

Adve et al., High Performance Fortran Compilation Techniques for Parallelizing Scientific Codes, IEEE, Nov. 1998, pp. 1-20.*

* cited by examiner

INTERPROCEDURAL DEAD STORE ELIMINATION

FIELD OF THE INVENTION

The present invention is directed to an improvement in computing systems and in particular to computer systems which provide for interprocedural dead store elimination in optimized code generation in the compilation of computer programs.

BACKGROUND OF THE INVENTION

Optimizing compilers permit efficient object code to be emitted given a particular piece of source code to be compiled. Source code that includes a store operation where the variable stored has a constant value or is not later used in the source code execution path may be the subject of optimization in compilers. Such an optimization is known as a dead store elimination optimization.

Dead store elimination is a well-understood optimization. Compiler optimizations, such as constant propagation, which propagate constant values forward in compiled code, often result in opportunities for store elimination. Such compiler optimizations permit the removal of code for such store operations if, after the constant propagation, the compiler can determine that the variable subject of the store operation is not subsequently used. Removing the code for such a store operation reduces execution path length in the compiled computer code.

If the scope of the code optimization is intraprocedural only restricted to be (within the bounds of a procedure or function) then it is not possible to eliminate code for a store operation if the variable subject to the operation is an external (global) variable. In such a case the compiler cannot determine if the variable is used in the execution path that follows execution of the function and is therefore not able to carry out a dead store elimination optimization. The function is potentially called in other procedures or functions. Although a particular variable may not be modified or used in the function itself, the variable may be "live" in one of the procedures or functions that calls the function.

To carry out a dead store elimination optimization for an external variable it is therefore necessary for the optimizing compiler to carry out an interprocedural dead code elimination analysis. One prior art approach to the interprocedural dead code elimination is to carry out a data flow analysis for the entire code being compiled to determine future uses of a variable subject to a possible dead code elimination optimization. Such an approach typically involves an overhead cost which makes its use in optimizing compilers prohibitive.

It is therefore desirable to have a computer system which carries out the interprocedural dead store elimination in an optimizing compiler without the requirement of a resource intensive data flow analysis step.

SUMMARY OF THE INVENTION

According to one aspect of the present invention, there is provided an improved system for dead code elimination in an optimizing compiler for computer code.

According to another aspect of the invention there is provided a method for determining the correctness of a potential interprocedural dead store optimization for an optimizing compiler, the optimizing compiler generating an intermediate representation of code to be compiled including a call graph, the method including a top-down traversal of the call graph, and including, for each procedure definition reached in the call graph traversal, the following steps 1. defining a live on exit set of variables for each procedure call point within the reached procedure definition by
   defining a basic block live set for each block of computer code in a control flow graph for the reached procedure definition, the basic block live set including the variables used in the block of computer code and the variables used in any procedure called within the block of computer code, and
   determining the live on exit set for each procedure call by taking the union of the basic block live sets for all successor blocks to the block in the control flow graph containing the procedure call point and by adjusting the union to include uses of variables in the code between the call point for the procedure and the end of the block containing the call point.
2. storing the said live on exit set of variables for each procedure call point in an entry in a live on exit data structure including a bit vector indexed by a call graph edge,
3. defining a live on exit set of variables for the reached procedure definition by taking the union of all stored entries in the live on exit data structure corresponding to call points for the reached procedure,
4. removing all entries in the live on exit data structure corresponding to call points for the reached procedure, and
5. using the live on exit set of variables for the reached procedure definition to determine the variables that are ineligible for interprocedural dead store elimination in the reached procedure definition.

According to another aspect of the invention there is provided the above method, in which the variables used in a procedure called within a block of computer code are determined by accessing the mod/use set for the procedure associated with the procedure definition node in the call graph.

According to another aspect of the invention there is provided the above method in which the step of using the live on exit set of variables for the reached procedure definition to determine the variables that are ineligible for interprocedural dead store elimination in the reached procedure definition includes the step of generating pseudo uses of the members of the live on exit set of variables for the reached procedure definition in the data flow graph for the reached procedure definition.

According to another aspect of the invention there is provided the above method in which the live on exit set data structure includes bit vector entries and is indexed by call graph edges.

According to another aspect of the invention there is provided the above method further including the step of using the live on exit set of variables for the procedure definition to determine whether the procedure definition may be cloned by the optimizing compiler.

According to another aspect of the invention there is provided a computer program product for the compilation of computer code, the computer program product including a computer usable medium having computer readable code means embodied in said medium, including computer readable program code means to carry out the above method.

According to another aspect of the invention there is provided an optimizing compiler including means for generating an intermediate representation of computer code, the intermediate representation including a call graph, means for traversing the call graph in top down order, means for storing a live on exit data structure, means for generating a record in the live on exit data structure for each procedure call encountered in the traversal of the call graph, the record including data representing variables that are live at the point of the procedure call, means for calculating the live on exit set for a procedure definition reached in traversing the call graph, the means for calculating the live on exit set including means for retrieving records from the live on exit data structure corresponding to the reached procedure definition and means for performing a union of the records to determine the live on exit set for the reached procedure definition, and means for signalling the availability of a dead store elimination optimization for a store operation contained in the reached procedure definition based on the live on exit set calculated for the procedure definition.

According to another aspect of the invention there is provided the above optimizing compiler, further including means for removing records associated with the reached procedure definition from the live on exit data structure following calculation of the live on exit set for the reached procedure definition.

According to another aspect of the invention there is provided a component for determining the correctness of a potential interprocedural dead store optimization for an optimizing compiler, the optimizing compiler generating an intermediate representation of code to be compiled including a call graph, the component including means to traverse the call graph in top-down order, and further including means for defining a live on exit set of variables for each procedure call point within the reached procedure definition by defining a basic block live set for each block of computer code in a control flow graph for the reached procedure definition, the basic block live set including the variables used in the block of computer code and the variables used in any procedure called within the block of computer code, and determining the live on exit set for each procedure call by taking the union of the basic block live sets for all successor blocks to the block in the control flow graph containing the procedure call point and by adjusting the union to include uses of variables in the code between the call point for the procedure and the end of the block containing the call point; means for storing the said live on exit set of variables for each procedure call point in an entry in a live on exit data structure including a bit vector indexed by a call graph edge; means for defining a live on exit set of variables for the reached procedure definition by taking the union of all stored entries in the live on exit data structure corresponding to call points for the reached procedure; means for removing all entries in the live on exit data structure corresponding to call points for the reached procedure following definition of the live on exit set of variables for the reached procedure definition, and means for determining the variables that are ineligible for interprocedural dead store elimination in the reached procedure definition, using the live on exit set of variables for the reached procedure definition.

Advantages of the present invention include improvements in compiled code optimization based on interprocedural dead store elimination. The interprocedural dead code optimization is carried out by making use of certain data structures available in existing compilers. The optimizing compiler of the present invention utilizes a dynamic data structure which reduces the need for memory in the execution of compilations.

BRIEF DESCRIPTION OF THE DRAWINGS

The preferred embodiment of the invention is shown in the drawings, wherein.

Figure 1:
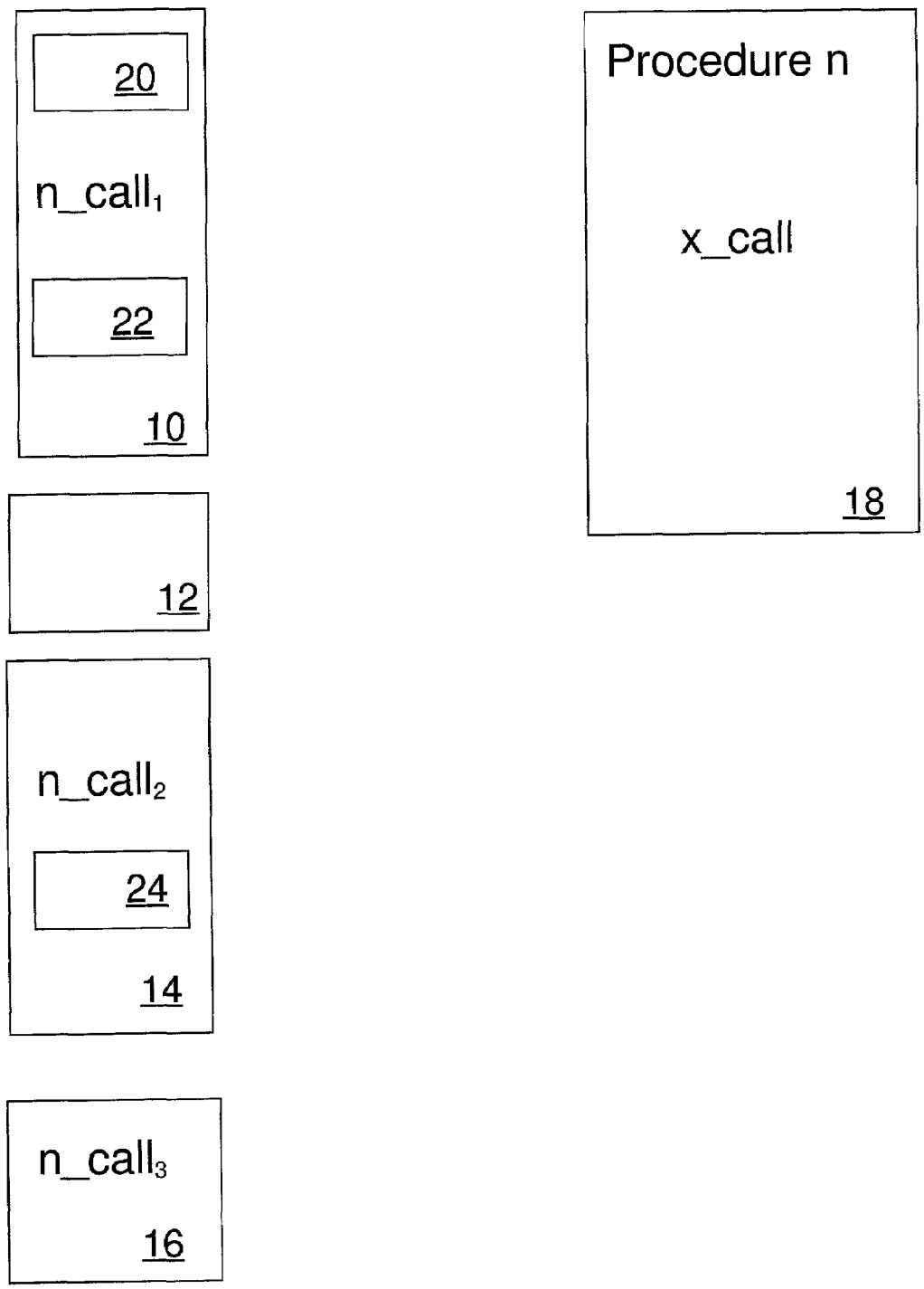
FIG. 1 is a block diagram representing example computer software code fragments potentially subject to the optimization of the preferred embodiment.

In the drawings, the preferred embodiment of the invention is illustrated by way of example. It is to be expressly understood that the description and drawings are only for the purpose of illustration and as an aid to understanding, and are not intended as a definition of the limits of the invention.

DETAILED DESCRIPTION OF THE PREFERRED EMBODIMENT

FIG. 1 illustrates, in a block diagram format, computer software code that may be optimized in compilation by the preferred embodiment of the present invention. In the example of FIG. 1 there are shown code blocks 10, 12, 14, 16 and procedure code 18 which defines a Procedure n. In code block 10 there are shown two sections of code 20, 22 as well as a call to Procedure n shown as $n\_call_1$. Code block 14 is shown containing a call to Procedure n (shown as $n\_call_2$), and code section 24. Code block 16 is shown containing a call to Procedure n ($n\_call_3$).

In the example of the code represented in the block diagram of FIG. 1, the system of the preferred embodiment is used in or with an optimizing compiler to determine whether interprocedural dead store elimination may be carried out. In the example, a global variable may be subject to a store operation in procedure definition 18. As a result, in the compilation of the code, there may be a consequent interprocedural constant propagation (to Procedure x, referred to by Statement x_call in procedure definition 8). In such a case, interprocedural dead store elimination is possible.

In the system of the preferred embodiment, interprocedural dead store elimination is indicated to be possible in the compilation of the code shown in the example only where a defined live on exit (LOE) set for Procedure n (defined in procedure definition 18) does not include the variable in question. A global variable modified or used in a procedure is determined to be part of the LOE set for that procedure if the variable is modified or used in code which may be executed following any call to that procedure in other blocks of code being compiled. In such a case, the variable is said to be "live" at the exit of the procedure in that the variable is potentially used after the procedure has been executed. As will be appreciated by those skilled in the art, a variable that is "live" at the end of a procedure cannot be considered for dead store elimination. On the other hand, if the variable is not included in the LOE set for a procedure then the variable is a potential candidate for dead store elimination. The LOE set for the procedure definition assists in determining the correctness of an interprocedural dead store elimination optimization.

The preferred embodiment thus indicates that interprocedural dead store elimination may occur where the global variable subject to the optimization is not part of the LOE set for the procedure in which the optimization is to occur. In the terminology of the preferred embodiment, there is an LOE set for the procedure definition (code 18, in the example of FIG. 1) and an LOE set associated with each call point for a procedure ($n\_call_1$, $n\_call_2$ and $n\_call_3$ in the example of FIG. 1). According to the preferred embodiment, the LOE set for the procedure itself is calculated by taking a union of the LOE sets for the call points for the procedure, as is described in more detail below. In the example of the code shown schematically in FIG. 1, the union of the LOE sets for n_call$_1$, n_call$_2$ and n_call$_3$ is used to determine the LOE set for Procedure n.

The preferred embodiment is described as being integrated in a link-phase portion of a compiler system. It will be understood by those skilled in the art that the preferred embodiment may be implemented in other ways such that an appropriate intermediate representation of the computer code being compiled is accessible and the system for interprocedural dead store elimination may be implemented without prohibitive overhead costs in the compilation of the code. In the description of the preferred embodiment, reference is made to procedures and interprocedural dead store elimination. It is to be understood that functions and other programming language subroutines are included in the term "procedure" as used in this description of the preferred embodiment.

The system of the preferred embodiment is implemented in a compiler that generates an intermediate representation of the computer code being compiled. In the preferred embodiment the intermediate representation includes a call graph. The call graph of the preferred embodiment is a directed multi-graph in which the nodes represent procedures in the code being compiled, and the edges represent call points. In the preferred embodiment, the nodes of the call graph are augmented with interprocedural mod/use sets. The mod/use set for a procedure is a data structure that records the variables that are modified and used, respectively, in the procedure (including those modified and used by the procedures called in that procedure). The use of interprocedural mod/use sets permits the compiler to determine the set of global variables which are either modified or used (or both) at a specific call point.

The system of the preferred embodiment also makes use of a control flow graph. This is a data structure that represents the code to be compiled in terms of basic blocks and represents control flow in the code with reference to these basic blocks. A further data structure in the intermediate representation is a data flow graph. Each of the call graph, control flow graph, and data flow graph is a data structure known in the art. The use of such graphs in an intermediate representation of code in an optimizing compiler is understood in the art.

The system of the preferred embodiment also includes basic block level live sets in the intermediate representation of the code being compiled. These are sets of data which represent intraprocedural live variables. Such block level live sets are known in the art and are typically represent variables which are live on entry to a specific block of code in a given procedure. In other words, the variables that are used in the block of code. In the preferred embodiment, local live sets are extended to represent the variables directly used in the block of code, the LOE set for the procedure containing the block of code, as well as the interprocedural use sets for each procedure call point in the block of code. The interprocedural use set for a procedure call is found by using the mod/use set for the procedure (stored in association with the node for the procedure in the call graph). These local live sets as extended are used in the preferred embodiment to determine the set of global variables that are live on exit to a call point.

A final data structure is a table of bit vectors used in the system of the preferred embodiment to represent the LOE set for a call point. Each bit vector represents the set of global variables that are live on exit for a given call point in the code being compiled. The table is indexed or hashed using a call graph edge index. As is set out below, entries in the table are removed after they have been used. In this way the size of the table is limited.

In operation, the system of the preferred embodiment traverses each node in the call graph in the intermediate representation of the code being compiled in reverse depth-first order (top-down). If the call graph contains nodes representing procedures without an intermediate representation (for example, assembler code being linked to the compiled code) then those nodes cannot be optimized. In such a case, conservative interprocedural mod/use sets are used in the preferred embodiment to represent the effect of procedures or functions without intermediate representations. In the terminology of the preferred embodiment, if the intermediate representation for a procedure or function is available, then it is identified as a defined function.

According to the preferred embodiment, for each defined function reached in the traversal of the call graph, a successor mod set is computed. The successor mod set is used to define the universe of variables potentially contained in the LOE sets for call points within the procedure. The successor mod set is defined to be the set of all global variables which may be modified by all calls in the function. It also includes the set of global variables defined in the function.

The system of the preferred embodiment computes the LOE set for each defined procedure in the call graph as it is traversed. The LOE set for a given procedure definition is computed by the system of the preferred embodiment where the LOE sets are known for all call points for that function. Because of the order in which the call graph is traversed, all LOE sets for all call points of a procedure may be known at the time that the procedure definition node is reached in the call graph. However, for recursive procedures, for example, the definition of the procedure will be reached before all call points are reached in the call graph. As a result, not all LOE sets for all call points are determined. In such a case, the calculation of the LOE set for the recursive procedure will not be possible If a given call point for a procedure has no definable LOE set then every relevant variable is assumed to be live on exit at the call point and all variables are included in the LOE set for the call point. If the LOE sets are available for all call points then the system of the preferred embodiment is able to compute the LOE set for the function as being the union of the LOE set for each call point for that procedure.

To calculate potential interprocedural dead store elimination in a procedure definition currently reached in the traversal of the call graph, the system of the preferred embodiment builds basic block level live sets, also referred to as local live sets, for the procedure. These local live sets represent the set of global variables that are live on entry to a basic block of code (as defined in the control flow graph). In the system of the preferred embodiment, interprocedural mod/use sets and the current procedure's LOE set are used in building the local live sets. The local live sets are extended in the preferred embodiment to also contain interprocedural variables. The system of the preferred embodiment is able to use the extended local live sets to carry out dead store elimination, where applicable. The local live sets indicate which variables are live and therefore which variables cannot be subject to a dead store elimination optimization. Where, on the other hand, a store of a global variable is found that is not in the local live set, then that variable is not subsequently used either locally or interprocedurally and the store is therefore a candidate for a dead store elimination optimization.

As indicated above, according to the preferred embodiment, LOE sets are generated for procedure call points. In the preferred embodiment, these LOE sets for call points are stored in an LOE table as bit vectors. The bit vectors for call points for a given procedure are maintained in the LOE table until the calculation of that procedure's LOE set is carried out. To determine the LOE of a call point within a procedure currently reached in the traversal of the call graph, the system of the preferred embodiment determines the LOE set for the block containing the call point. This is computed by carrying out the union of local live sets of each successor block (in the control flow graph) for the procedure. The LOE set for the call point is then determined by adjusting the union set for uses of variables that occur between the call point and the end of the block.

Turning to the example of FIG. 1, the LOE set for the call point of n_call$_1$ is determined by taking the union of the LOE sets for blocks 12, 14, 16. This resulting LOE set for the call point of n_call$_1$ is then adjusted for uses of variables that occur in code 22 within block 10.

The system of the preferred embodiment calculates the LOE set for a call point of a procedure by considering each variable in the interprocedural mod set of the function being called. An entry in the LOE table is then made for the call point. All variables which are live on exit to the call point, as calculated above, are represented in the bit vector defining the LOE set for that call point that is stored in the LOE table (and indexed or hashed by the procedure).

The system of the preferred embodiment, after carrying out the calculations set out above for the procedure reached in the call graph, removes all entries in the LOE table that correspond to calls to the procedure currently reached in the traversal of the call graph. This prevents the LOE table from becoming prohibitively large.

In the preferred embodiment there are interprocedural mod/use sets provided that are pre-defined for library functions and procedures. This permits the calculation of LOE sets to be more precise than is the case where the most conservative estimate of mod/use sets must otherwise be used for such library routines. In effect, library routines with pre-defined mod/use sets may be treated as defined functions.

In the preferred embodiment, the presence of an external variable in the LOE set for a procedure is indicated by the inclusion of a pseudo use of the variable in the data flow graph generated in the intermediate representation of the code being compiled. This technique permits external variables which are live on exit to be treated by the compiler as local variables which are used in the function. The result is that the data flow graph is defined such that the external variable is represented in the graph. Dead store elimination optimization is therefore prevented for the variable, due to its presence in the graph. The inclusion of a pseudo use of such variables permits LOE global variables to be handled without requiring a special case to be defined in the dead store elimination optimization.

In the preferred embodiment it is also possible to use the LOE sets to determine where cloning of functions is possible in the optimization of the compilation for the code. Those variables live on exit will be used to determine if cloning of the procedure or function is possible, and if so in what manner.

As may be seen from the above description, the system of the preferred embodiment is well-suited for inclusion in an interprocedural optimizer in a compiler (typically found in the linker component of such a compiler). The preferred embodiment makes use of a top down traversal of the call graph to build LOE sets for call points before determining LOE sets for function definitions. The calculation of the call point LOE sets permits the LOE set for a given function to be efficiently calculated when the function is reached in the traversal of the call graph. Once the LOE for the function is determined, it is possible to eliminate the LOE sets for the call points of the function from the LOE table data structure. This incremental approach to the calculation of the LOE sets for functions in the compiled code provides for memory efficiencies in the compilation optimization process.

Although a preferred embodiment of the present invention has been described here in detail, it will be appreciated by those skilled in the art, that variations may be made thereto, without departing from the spirit of the invention or the scope of the appended claims.

The embodiments of the invention in which an exclusive property or privilege is claimed are defined as follows:

1. A method for determining the correctness of a potential interprocedural dead store optimization for an optimizing compiler, the optimizing compiler generating an intermediate representation of code to be compiled, including a call graph, the method comprising a top-down traversal of the call graph, and, for each procedure definition reached in the call graph traversal, further comprising:

determining a live on exit set of interprocedural global variables for the reached procedure definition;

determining a live on exit set of interprocedural global variables for each procedure call point within the reached procedure definition;

storing the determined live on exit set of interprocedural global variables for each procedure call point in a live on exit data structure; and using the determined live on exit set of interprocedural global variables for the reached procedure definition to determine interprocedural global variables that are ineligible for interprocedural dead store elimination in the reached procedure definition.

2. The method of claim 1 in which the live on exit set of interprocedural global variables for the reached procedure definition is determined by taking the union of all stored entries in the live on exit data structure corresponding to call points for the reached procedure.

3. The method of claim 2 in which determining the live on exit set of interprocedural global variables for each procedure call point within the reached procedure definition comprises:

determining a basic block live set for each block of computer code in a control flow graph for the reached procedure definition, the basic block live set comprising the variables used in the block of computer code and the variables used in any procedure called within the block of computer code; and determining the live on exit set of interprocedural global variables for each procedure call point by taking the union of the basic block live sets for all successor blocks to the block in the control flow graph containing the procedure call point, and adjusting the union to include uses of variables in the code between the call point for the procedure and the end of the block containing the call point.

4. The method of claim 1 in which determining the live on exit set for each procedure call point in the reached procedure definition comprises:

determining a basic block live set for each block of computer code in a control flow graph for the reached procedure definition, the basic block live set comprising the variables used in the block of computer code and the variables used in any procedure called within the block of computer code; and determining the live on exit set for each procedure call point by taking the union of the basic block live sets for all successor blocks to the block in the control flow graph containing the procedure call point, and adjusting the union to include uses of variables in the code between the call point for the procedure and the end of the block containing the call point.

5. The method of claim 2, further comprising, after determining the live on exit set of interprocedural global variables for the reached procedure definition, removing all entries in the live on exit data structure corresponding to call points for the reached procedure.

6. The method of claim 3, in which the variables used in a procedure called within a block of computer code are determined by accessing the mod/use set for the procedure associated with the procedure definition node in the call graph.

7. The method of claim 1 in which using the live on exit set of interprocedural global variables for the reached procedure definition to determine the variables that are ineligible for interprocedural dead store elimination in the reached procedure definition comprises generating pseudo uses of the members of the live on exit set of interprocedural global variables for the reached procedure definition in the data flow graph for the reached procedure definition.

8. The method of claim 1 in which the live on exit data structure comprises bit vector entries and is indexed by call graph edges.

9. The method of claim 2 further comprising using the live on exit set of interprocedural global variables for the reached procedure definition to determine whether the reached procedure definition may be cloned by the optimizing compiler.

10. A method for determining the correctness of a potential interprocedural dead store optimization for an optimizing compiler, the optimizing compiler generating an intermediate representation of code to be compiled, including a call graph, the method comprising a top-down traversal of the call graph, and, for each procedure definition reached in the call graph traversal, further comprising:

determining a live on exit set of interprocedural global variables for each procedure call point within the reached procedure definition by:

determining a basic block live set for each block of computer code in a control flow graph for the reached procedure definition, the basic block live set comprising the interprocedural global variables used in the block of computer code and the interprocedural global variables used in any procedure called within the block of computer code; and determining the live on exit set of global variables for each procedure call point by taking the union of the basic block live sets for all successor blocks to the block in the control flow graph containing the procedure call point, and adjusting the union to include uses of interprocedural global variables in the code between the call point for the procedure and the end of the block containing the call point;

storing the determined live on exit set of interprocedural global variables for each procedure call point in a live on exit data structure comprising a bit vector indexed by a call graph edge;

determining a live on exit set of interprocedural global variables for the reached procedure definition by taking the union of all stored entries in the live on exit data structure corresponding to call points for the reached procedure;

removing all entries in the live on exit data structure corresponding to call points for the reached procedure; and using the live on exit set of interprocedural global variables for the reached procedure definition to determine interprocedural global variables that are ineligible for interprocedural dead store elimination in the reached procedure definition.

11. A computer program product for the compilation of computer code, the computer program product comprising a computer usable medium having computer readable code means embodied in said medium, comprising computer readable program code means to carry out the method of claim 1.

12. An optimizing compiler comprising:

means for generating an intermediate representation of computer code, the intermediate representation comprising a call graph;

means for traversing the call graph in top down order;

means for storing a live on exit data structure;

means far generating a record in the live on exit data structure for each procedure call encountered in the traversal of the call graph, the record comprising data representing interprocedural global variables that are live at the point of the procedure call; and means for calculating the live on exit set for a procedure definition reached in traversing the call graph, wherein the means for calculating the live on exit set comprises means for retrieving records from the live on exit data structure corresponding to the reached procedure definition, means for performing a union of the records to determine the live on exit set for the reached procedure definition, and means for signaling the availability of a dead store elimination optimization for a store operation contained in the reached procedure definition based on the live on exit set calculated for the procedure definition.

13. The optimizing compiler of claim 12, further comprising means for removing records associated wit the reached procedure definition from the live on exit data structure following calculation of the live on exit set for the reached procedure definition.

14. A component for determining the correctness of a potential interprocedural dead store optimization for an optimizing compiler, the optimizing compiler generating an intermediate representation of code to be compiled, including a call graph, the component comprising:

means to traverse the call graph in top-down order;

means for determining a live on exit set of interprocedural global variables for each procedure call point within a reached procedure definition during the call graph traversal by:

determining a basic block live set for each block of computer code in a control flow graph for the reached procedure definition, the basic block live set comprising the interprocedural global variables used in the block of computer code and the interprocedural global variables used in any procedure called within the block of computer code, and determining the live on exit set for each procedure call by taking the union of the basic block live sets for all successor blocks to the block in the control flow graph containing the procedure call point and by adjusting the union to include uses of interprocedural global variables in the code between the call point for the procedure and the end of the block containing the call point, means for storing the live on exit set of interprocedural global variables for each procedure call point in an entry in a live on exit data structure comprising a bit vector indexed by a call graph edge, means for determining a live on exit set of interprocedural global variables for the reached procedure determination by talking the union of all stored entries in the live on exit data structure corresponding to call points for the reached procedure, means for removing all entries in the live on exit data structure corresponding to call points for the reached procedure following determination of the live on exit set of interprocedural global variables for the reached procedure definition, and means for determining the interprocedural global variables that are ineligible for interprocedural dead store elimination in the reached procedure definition, using the live on exit set of interprocedural global variables for the reached procedure definition.

15. The method of claim 1, further comprising determining variables, other than variables determined to be ineligible for interprocedural dead store elimination, to be eligible for interprocedural dead store elimination.

16. The method of claim 15, further comprising eliminating the variables determined to be eligible for interprocedural dead store elimination.

17. The method of claim 10, further comprising determining variables, other than variables determined to be ineligible for interprocedural dead store elimination, to be eligible for interprocedural dead store elimination.

18. The meted of claim 17, further comprising eliminating the variables determined to be eligible for interprocedural dead store elimination.

* * * * *